US010116763B2

(12) United States Patent
Houdaille et al.

(10) Patent No.: US 10,116,763 B2
(45) Date of Patent: Oct. 30, 2018

(54) METHOD FOR OPERATING A CACHE ARRANGED ALONG A TRANSMISSION PATH BETWEEN CLIENT TERMINALS AND AT LEAST ONE SERVER, AND CORRESPONDING CACHE

(71) Applicant: THOMSON LICENSING, Issy de Moulineaux (FR)

(72) Inventors: Remi Houdaille, Cesson Sevigne (FR); Charline Taibi, Chartres de Bretagne (FR); Stephane Gouache, Cesson Sevigne (FR)

(73) Assignee: Thomson Licensing, Issy-les-Moulineaux (FR)

( * ) Notice: Subject to any disclaimer, the term of this patent is extended or adjusted under 35 U.S.C. 154(b) by 20 days.

(21) Appl. No.: 14/788,690

(22) Filed: Jun. 30, 2015

(65) Prior Publication Data

US 2016/0006830 A1 Jan. 7, 2016

(30) Foreign Application Priority Data

Jul. 4, 2014 (EP) ..................................... 14306095

(51) Int. Cl.
*G06F 15/167* (2006.01)
*H04L 29/08* (2006.01)
*H04L 29/06* (2006.01)

(52) U.S. Cl.
CPC ...... *H04L 67/2842* (2013.01); *H04L 65/4084* (2013.01); *H04L 65/608* (2013.01);
(Continued)

(58) Field of Classification Search
CPC . H04L 65/4084; H04L 65/80; H04L 67/2842; H04L 67/02; H04L 67/2852;
(Continued)

(56) References Cited

U.S. PATENT DOCUMENTS

| 8,639,710 B2* | 1/2014 | Arnold ................ G06F 17/3048 707/713 |
| 2004/0240386 A1* | 12/2004 | Irudayaraj ............. H04L 45/742 370/235 |
| 2012/0151044 A1* | 6/2012 | Luna ....................... H04W 4/18 709/224 |
| 2012/0254456 A1* | 10/2012 | Visharam ........... H04N 21/2343 709/231 |

(Continued)

FOREIGN PATENT DOCUMENTS

| EP | 2466870 | 6/2012 |
| KR | 0984282 | 9/2010 |
| WO | WO2013060791 | 5/2013 |

OTHER PUBLICATIONS

Wei et al: "Caching Model in Structured P2P Protocolpublication Data" Journal of Chinese Computer Systems; vol. 30, No. 7; 1314-1320.
(Continued)

*Primary Examiner* — Dustin Nguyen
*Assistant Examiner* — Hao Nguyen
(74) *Attorney, Agent, or Firm* — Myers Wolin LLC

(57) ABSTRACT

A cache arranged between client terminals and at least one server, said cache being configured to receive, from client terminals, requests for at least a first representation of a segment of a multimedia content available in a plurality of representations, comprising:
a communication module configured to receiving, in a first period of time, a plurality of requests for a given segment from the client terminals, each request specifying one first representation and at least one alternative representation of said given segment;
a module of relevancy configured to determining at least one main relevant requested representation amongst the representations of the requests received during the first period of time;
(Continued)

and wherein the communication module is further configured to request said main relevant representation from a remote server.

9 Claims, 3 Drawing Sheets

(52) U.S. Cl.
CPC .......... *H04L 65/80* (2013.01); *H04L 67/2847* (2013.01); *H04L 67/2852* (2013.01)

(58) Field of Classification Search
CPC ... H04L 45/742; H04L 65/605; H04L 65/608; H04L 67/28; H04L 67/2847; H04L 67/289; H04N 21/2225; H04N 21/23439; H04N 21/2393
USPC ........ 709/213, 224, 226, 231, 235; 707/705, 707/713, 759, 769
See application file for complete search history.

(56) References Cited

U.S. PATENT DOCUMENTS

| | | | |
|---|---|---|---|
| 2013/0173737 A1* | 7/2013 | Liu .................. | H04N 21/23439 709/213 |
| 2015/0193347 A1* | 7/2015 | Kluesing .......... | G06F 17/30132 711/137 |
| 2015/0358418 A1* | 12/2015 | Gouache ................ | H04L 67/02 709/213 |

OTHER PUBLICATIONS

Hasslinger et al: "Evaluation of Caching Strategies Based on Access Statistics of Past Requests"; Measurement, Modelling, and Evaluation of Computing Systems and Dependability and Fault Tolerance. 17th International GI/ITG Conference, MMB & DFT 2014. Proceedings: LNCS 8376; pp. 120-135.
Search Report dated September 30, 2014.

* cited by examiner

METHOD FOR OPERATING A CACHE ARRANGED ALONG A TRANSMISSION PATH BETWEEN CLIENT TERMINALS AND AT LEAST ONE SERVER, AND CORRESPONDING CACHE

This application claims the benefit, under 35 U.S.C. § 119 of European Patent Application No. 14306095.2, filed Jul. 4, 2014.

TECHNICAL FIELD

The present invention relates generally to the domain of the adaptive streaming technology over, for instance but not exclusively, HTTP (HyperText Transfer Protocol) and, in particular, to the operation of a cache arranged along the transmission path between client terminals and remote servers.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Adaptive streaming over HTTP (also called multi-bitrate switching or HAS) is quickly becoming a major technology for multimedia content distribution. Among the HTTP adaptive streaming protocols which are already used, the most famous are the HTTP Live Streaming (HLS) from Apple, the Silverlight Smooth Streaming (SSS) from Microsoft, the Adobe Dynamic Streaming (ADS) from Adobe, the Dynamic Adaptive Streaming over HTTP (DASH) developed by 3GPP and MPEG (standardized as ISO/IEC 23009-1:2012).

When a client terminal wishes to play an audiovisual content (or A/V content) in adaptive streaming, it first has to get a file describing how this A/V content might be obtained. This is generally done through the HTTP protocol by getting a description file, so-called manifest, from an URL (Uniform Resource Locator), but can be also achieved by other means (e.g. broadcast, e-mail, SMS and so on). The manifest—generated in advance and delivered to the client terminal by a remote server—basically lists the available representations (also called instances or versions) of such an A/V content (in terms of bitrate, resolution and other properties). A representation is associated with a given quality level (bitrate).

The whole data stream of each representation is divided into segments (also called chunks) of equal duration (accessible by a separate URL) which are made such that a client terminal may smoothly switch from one quality level to another between two segments. As a result, the video quality may vary while playing but rarely suffers from interruptions (also called freezes).

At the client side, the segments are selected based on a measure of the available bandwidth of the transmission path. In particular, a client terminal usually requests the representation of a segment corresponding to a bitrate encoding and thus a quality compliant with the measured bandwidth.

When a cache is along the transmission path between a client terminal and a remote server, one representation of a given segment may already be stored in said cache, in case another client has previously requested the same segment with the same representation or in case a Content Delivery Network (CDN) has already provisioned the segment in the cache. Thus, the response to an HTTP request for said given segment is faster than if the segment comes from the remote server and duplicate transmission can be avoided, effectively saving network and server resources.

Nevertheless, the HTTP adaptive streaming appears not to be cache friendly (or at least less cache friendly than the so called layered base switching as for instance H264-SVC). Indeed, if a first client terminal requests a representation R1 of a given segment and a second client terminal—sharing a part of the transmission path with said first client terminal and a cache—requests a representation R2 of said given segment (at a higher or lower quality), then the cache is not hit leading to higher load on the network segment between the cache and the server with the risk of causing congestion. The benefits of caching are then completely annihilated and caches are currently unable to improve this situation.

To overcome this shortcoming, it is known that a client terminal may send a request for a given segment comprising a first (also called preferred) representation and one or several alternative representations. When such a request arrives at an HAS aware cache (meaning that said cache is compliant with an HAS protocol, such as MPEG-DASH), said cache delivers the first representation if cached or browses the alternative representations in case the first representation is not cached. When one of the alternative representations is cached, the cache sends said alternative representation to the client terminal. When none of the first and alternative representations of the request is cached, the request is forwarded upstream.

However, the representations stored in the cache are determined by previous requests. If a first client terminal requests a segment with a representation R, subsequent client terminals—requesting the same segment and specifying the representation R as an alternative representation—will actually receive the representation R rather than the first (or preferred) representation of the corresponding request. Since the requests of the subsequent client terminals are considered handled by the cache, other representations of the segment will not be loaded into the cache (unless some client terminals request for a first representation, not cached, without allowing R as an alternative representation). If the representation R is a low quality representation (for instance because the first client terminal starting the request for a given segment undergoes poor network conditions for itself and requests the lowest quality representation), all or a majority of client terminals may play a low quality video while resources and network conditions may allow to deal with a higher quality.

Thus, the first client terminal to request a given segment may influence the response (and then the quality) provided by the cache to the subsequent client terminals requesting the same segment. As a consequence, if the first client terminal is unfortunately not representative of the needs of the majority of client terminals, said majority of terminals will suffer from the request and behavior of the first client terminal.

The present invention overcomes at least the above mentioned shortcomings.

SUMMARY

The invention concerns a method for operating a cache arranged between client terminals and at least one server, said cache being configured to receive requests from client terminals for at least a first representation of a segment of a multimedia content available in a plurality of representations, which is remarkable in that it comprises:

receiving, in a first period of time, a plurality of requests for a given segment from client terminals, each request specifying one first representation and at least one alternative representation of said given segment;

determining at least one main relevant requested representation amongst the representations of the requests received during the first period of time;

requesting said main relevant representation of the given segment from a remote server.

In an embodiment compliant with the present invention, the step of determining a main relevant requested representation comprises:

determining a score of relevancy for each representation of said given segment specified in the requests received during the first period of time;

selecting, as the main relevant representation of said given segment, the representation with the highest score of relevancy.

In particular, the score of relevancy associated with a requested representation of said given segment may correspond to the number of times said requested representation is specified in the requests received by the cache.

Thus, thanks to the embodiment of the present invention, a cache can take into account statistical data about client requests in order to provide, for instance, an overall better quality of the multimedia content (e.g. an A/V content) to the maximum number of client terminals, while maintaining a high proportion of content served from the cache itself.

In a further aspect of said embodiment, each representation of a received request having a priority level, the number of times a representation is requested may be weighted by a first factor depending on the priority level of said representation.

In another aspect of said embodiment, said method may comprise:

determining if there are one or several remaining client terminals which have not requested the main relevant representation as a first representation or as an alternative representation;

building a list of representations which have been requested by said one or several remaining client terminals;

determining the most auxiliary relevant representation of the built list, based on the scores of relevancy and requesting said auxiliary relevant representation to a server.

In addition, said method may further comprise the request for said main relevant representation of the next segment from a remote server, when not stored in said cache.

In another aspect of said embodiment, the method may further comprise:

counting the number of times each requested representation already stored in the cache is sent to client terminals over a second period of time to obtain a score of hits for each requested representation, a requested representation sent to a client terminal as a first representation being counted differently than a requested representation sent as an alternative representation;

deleting at least the stored representation with the lowest score of hits.

Besides, the first period of time may start at a given moment and ends when the cache has received a predefined number of requests from client terminals.

The present invention also concerns a cache arranged between client terminals and at least one server, said cache being configured to receive, from client terminals, requests for at least a first representation of a segment of a multimedia content available in a plurality of representations. Said cache comprises:

a communication module configured to receive, in a first period of time, a plurality of requests for a given segment from the client terminals, each request specifying one first representation and at least one alternative representation of said given segment;

a module of relevancy configured to determine at least one main relevant requested representation amongst the representations of the requests received during the first period of time;

and wherein the communication module is further configured to request said main relevant representation from a remote server.

In an embodiment compliant with the present invention, said cache further comprises:

a scoring module configured to determine a score of relevancy for each representation of said given segment specified in the requests received during the first period of time;

a selecting module configured to select, as the main relevant representation of said given segment, the representation with the highest score of relevancy.

In particular, the scoring module comprises at least one first counter configured to determine the number of times each requested representation is specified in the requests received by the cache, which corresponds to the score of relevancy associated with said requested representation.

In a further aspect of said embodiment, each representation of a received request having a priority level, the scoring module may be further configured to weight, by a first factor depending on the priority level of said representation, the number of times a representation is requested.

Moreover, the module of relevancy may further be configured:

to determine if there are one or several remaining client terminals which have not requested the main relevant representation as a first representation or as an alternative representation;

to build a list of representations which have been requested by said one or several remaining client terminals;

to determine the most auxiliary relevant representation of the built list, based on the scores of relevancy and to request said auxiliary relevant representation to a server.

In addition, the communication module is further configured to request said main relevant representation of the next segment from a remote server when not stored in said cache.

In another aspect of said embodiment, said cache may further comprise:

a second counter configured to count the number of times each requested representation already stored in the cache is sent to client terminals over a second period of time and to obtain a score of hits for each requested representation, a requested representation sent to a client terminal as a first representation being counted differently than a requested representation sent as an alternative representation;

a removal module configured to delete at least the stored representation with the lowest score of hits.

In an example compliant with the present invention, said cache is a HTTP Adaptive Streaming aware cache.

The present invention further concerns a computer program product downloadable from a communication network and/or recorded on a medium readable by computer and/or executable by a processor, comprising program code instructions for implementing the steps of the above mentioned method.

In addition, the present invention also concerns a non-transitory computer readable medium comprising a computer program product recorded thereon and capable of being run by a processor, including program code instructions for implementing the steps of the method previously described.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

In FIGS. 1 to 4, the represented blocks are purely functional entities, which do not necessarily correspond to physically separate entities. Namely, they could be developed in the form of software, hardware, or be implemented in one or several integrated circuits, comprising one or more processors.

Wherever possible, the same reference numerals will be used throughout the figures to refer to the same or like parts.

DESCRIPTION OF EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems.

According to a particular embodiment, the present invention is depicted with regard to the HTTP adaptive streaming protocol (or HAS) and, in particular, with regard to MPEG-DASH. Naturally, the invention is not restricted to such a particular environment and other adaptive streaming protocol could of course be considered and implemented.

Figure 1:
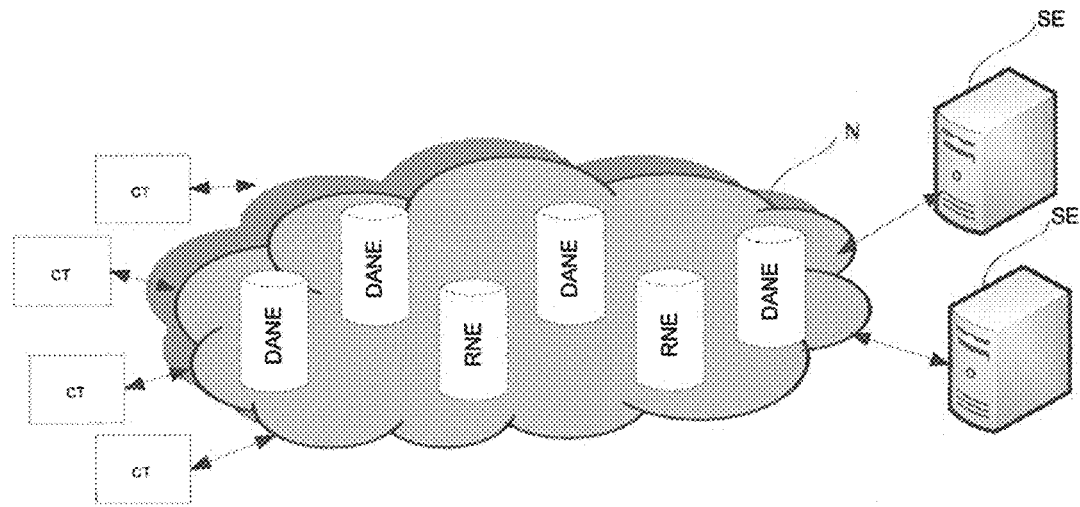
FIG. 1 is a schematic diagram of a Client-Server network architecture wherein the present invention might be implemented.

As depicted in FIG. 1, the Client-Server network architecture, supported by one or several networks N (only one is represented in the Figures), wherein the present invention might be implemented, comprises several client terminals CT, one or more HTTP servers SE, a plurality of smart caches DANE and one or more legacy caches RNE. According to DASH, such servers SE are also named Media Origin.

They generate for instance the media presentation description (or MPD), so called manifest. This is the source of content distribution: the multimedia content may come from some external entity and be converted to HAS format at the Media Origin.

A smart cache DANE is a caching element in the network N that is configured to understand that a HAS content is delivered. Using MPEG-DASH terminology, a smart cache is considered as DASH Aware Network Element (DANE).

A legacy cache RNE is a caching element in the network N which has no knowledge of the type of data that transits through it, or at least it does not understand the HAS aspects. In MPEG-DASH terminology, a legacy cache is considered as Regular Network Element (RNE).

The client terminals CT wish to obtain a multimedia content from one of the HTTP servers SE. Said multimedia content is divided into a plurality of segments. It is assumed that the multimedia content is available at different representations at a server SE. The HTTP server SE is able to stream segments to the client terminals CT, upon the client request, using HTTP adaptive streaming protocol over one or more TCP/IP connections.

Each client terminal CT can be a portable media device, a mobile phone, a tablet or a laptop, a TV set, a Set Top Box, a game device or an integrated circuit. Naturally, a client terminal CT might not comprise a complete video player, but only some sub-elements such as the ones for demultiplexing and decoding the media content and might rely upon an external means to display the decoded content to the end user. In this case, a client terminal CT is a HAS aware video decoder, such as a set-top box.

Figure 2:
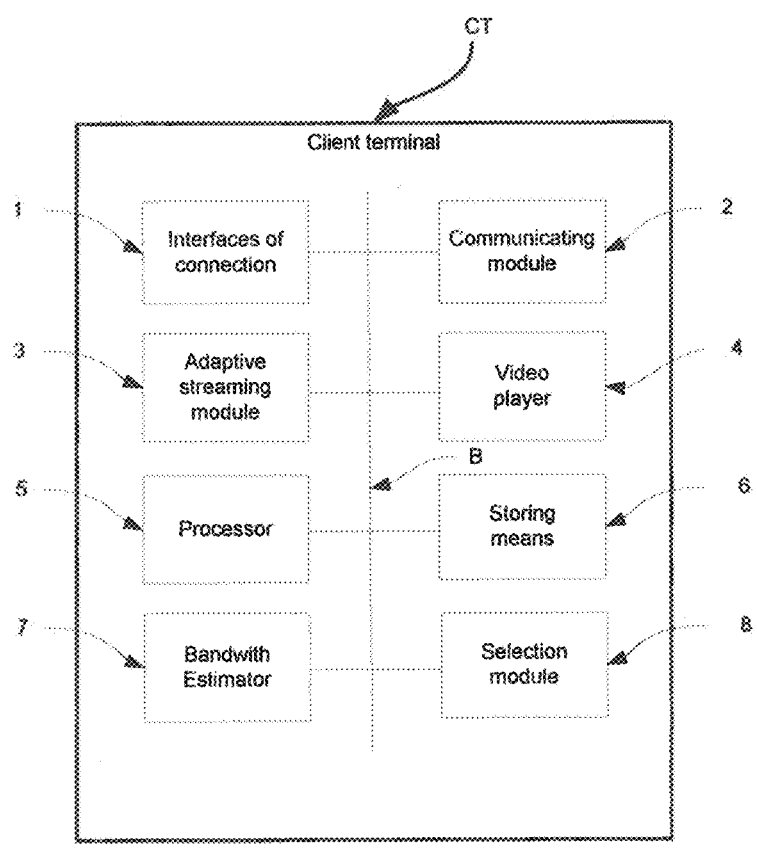
FIG. 2 is a block diagram of an example of a client terminal according to an embodiment of the present invention.

As shown in FIG. 2, a client terminal CT comprises at least:
- one or more interfaces of connection 1 (wired and/or wireless, as for example Wi-Fi, Ethernet, ADSL, Cable, Mobile and/or Broadcast (e.g. DVB, ATSC) interface);
- a communication module 2 containing the protocol stacks to communicate to the HTTP server SE. In particular the communication module 2 comprises the TCP/IP stack well known in the art. Of course, it could be any other type of network and/or communicating means enabling the client terminal CT to communicate to the HTTP server SE;
- an adaptive streaming module 3 which receives the HTTP streaming multimedia content from the HTTP server SE. It continually selects the segment at the bit rate that better matches the network constraints and its own constraints;
- a video player 4 adapted to decode and render the multimedia content;
- one or more processors 5 for executing the applications and programs stored in a non-volatile memory of the client terminal CT;
- storing means 6, such as a volatile memory, for buffering the segments received from the HTTP server SE before their transmission to the video player 4;
- a bandwidth estimator 7 configured for estimating the bandwidth of the transmission path;
- a selection module 8 configured for determining a set of allowable representations the client terminal CT might request. The allowable representations are selected among the available representations of a given segment of the multimedia content, as listed in the associated manifest. In particular, the determination—by the module 8—of the set of allowable representations of the given segment can be based on one or several performance criteria (as for instance the bandwidth estimated, capabilities of the client terminal, representation of the previously requested segment, quality of experience required by an end user of the client terminal CT, etc.);

an internal bus B to connect the various modules and all means well known to the skilled in the art for performing the generic client terminal functionalities.

Figure 3:
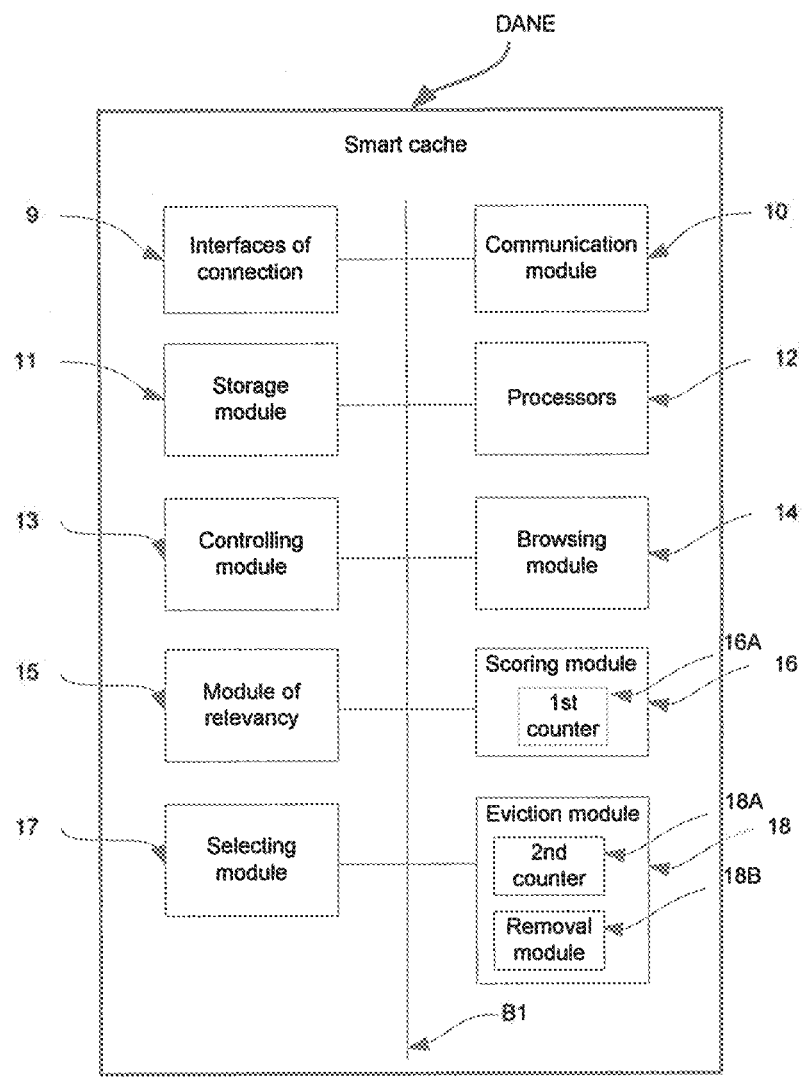
FIG. 3 is a block diagram of an example of smart cache according to said embodiment of the present invention.

As illustrated in FIG. 3, a smart cache DANE according to said embodiment comprises:

one or more interfaces of connection 9 (wired and/or wireless);

a communication module 10 comprising the protocol stacks to communicate through the interfaces of connection 9. In particular, the communication module can comprise an Internet Protocol stack, noted IP stack;

a storage module 11, such as a volatile memory and/or a permanent memory, for storing segments of multimedia contents received from one or more servers SE in order to transmit them to client terminals CT, requesting such multimedia contents;

one or more processors 12 for executing the applications and programs, for instance, stored in the storage module 11;

a controlling module 13 formed to check whether or not the smart cache DANE has already cached a first (or preferred) representation of a request (sent by a client terminal CT) requesting the first representation or one alternative representation of a list when the first representation is not cached;

a browsing module 14 adapted to browse, in order of preference, alternative representations listed in a request sent by a client terminal CT, in case the first representation is not cached. In a variant, the controlling module and the browsing module may define only one module;

an internal bus B1 to connect the various modules, processing means and all means well known to the skilled in the art for performing the generic residential gateway functionalities.

In the following, it is assumed that a plurality of client terminal CT sends a request on the network N to obtain a given segment of a multimedia content. Each request specifies a first representation and one or more alternative representations of said given segment, which are browsed by priority level when the first representation is not available at the smart cache DANE receiving the request. Indeed a priority level is associated with each representation specified in a request sent by a client terminal CT, the first (or preferred representation) having the highest priority level. As a variant or as a complement, the priority level is implicitly provided by the list of representations specified in each request. Naturally, the smart cache DANE may also receive some requests for only a first (or preferred) representation without specifying any alternative representation.

According to said embodiment, the communication module 10 is further configured to receive (through the interfaces of connection 9), in a first period of time, a plurality of requests for the given segment from the client terminals (CT). Said first period of time may be, for instance, triggered periodically or upon receipt of a given request for said segment (e.g. the first request for said segment when none of its representation has been loaded in the smart cache DANE yet). In addition, said first period of time may, for instance, start at a given moment and end when the smart cache DANE has received either a predefined number of requests from client terminals or a predefined number of a given representation of said segment. In a further complement, said first period of time may also have be defined by an upper limit (e.g. several micro-seconds), which may preferably be small compared with the normal delay for acquiring a content from a remote server SE. In a variant, the first period of time may only be defined by a constant value (e.g. several micro-seconds).

Moreover, the smart cache DANE of FIG. 3 further comprises:

a module of relevancy 15 which is configured to determine at least one main relevant requested representation amongst all the representations of the requests received by the smart cache DANE during the first period of time;

a scoring module 16 which is configured to determining a score of relevancy to each representation of the given segment specified in the requests received during the first period of time. To this end, the scoring module 16 may comprise a first counter 16A adapted to count the number of times a requested representation (namely a representation of the given segment present in at least one request received in the first period of time) is specified in the requests received by the smart cache DANE. This determined number of times corresponds to the score of relevancy associated with a requested representation of the given segment. In a refinement of said preferred embodiment, each representation of a received request having a priority level, the scoring module 16 may be further configured to weight—with a priority factor depending on the priority level of said representation—the counted number of times a representation is requested. Thus, the score of relevancy associated with each requested representation takes into account its priority level in each request. Naturally, in a variant, the counted number of times may be weighted with a weighting factor, distinct and independent from the priority level of the corresponding representation. In a refinement, when the first period of time ended before reaching a predefined number of requests from client terminals, the scoring module 16 may use the scores of relevancy similarly computed for a previous segment to make a weighted averaging between the scores of relevancy obtained for the given current segment and the previous segment. The weight may be proportional to the number of client requests. Such a refinement takes into account the previous knowledge of relevancy to prevent from being influenced by a small set of early client terminals which would request low quality representation;

a selecting module 17 which is configured to compare the obtained scores of relevancy attached to the requested representations of the given segment. It is further configured to select, as the main relevant representation of the given segment, the requested representation which has the highest score of relevancy amongst the various scores obtained.

In the illustrated embodiment, the module of relevancy 15, the scoring module 16 and the selecting module 17 are distinct, while, in a variant not illustrated in the figures, these three modules might be combined to form a single module. In a variant, the selecting module 17 may be integrated within the module of relevancy 15.

Once the highest score of relevancy has been selected by the selecting module 17 and has been considered as the main relevant representation by the module of relevancy 15, the communication module 10 is further configured to request said relevant representation from a remote server SE which is not stored yet in the storage module 11 of said smart cache DANE.

At this point, the selected main relevant representation is suitable for a large number of client terminals CT. However, since the requested representations indicated by client terminals in their requests do not necessarily overlap between all client terminals CT, the main relevant representation may be unacceptable for a subset of considered client terminals, hereinafter called remaining client terminals CT (i.e. the client terminals CT that did not request the main relevant representation as the preferred one or as an alternative representation). For these remaining client terminals, the smart cache DANE may download one or several additional representations from a server SE to satisfy their requests, in addition to the selected relevant representation.

To this end, to minimize the number of such additional representations and maximize satisfaction, the module of relevancy 15 may be further configured:

- to determine if there is at least one remaining client terminal CT which has not requested the main relevant representation as the first one or as an alternative representation;
- to build a list of representations which are requested by at least one remaining client terminal CT;
- to determine the most relevant representation (hereinafter called auxiliary relevant representation) of the built list, based on scores of relevancy already computed by the scoring module 16. Then, the communication module 10 of the smart cache DANE can request this auxiliary relevant representation;
- to check whether all remaining client terminals CT can be served, or not, by this auxiliary relevant representation. If not, the module of relevancy 15 updates the list and determines the new most relevant representation as previously indicated. The process stops when the list is empty (i.e. there is no remaining client terminals CT, all requesting client terminals can be served by the smart cache DANE).

For all client terminals CT to be served, in case several relevant representations have been determined (a main relevant representations and one or several auxiliary representations), the representation to be sent to each client terminal CT may be chosen—by the communication module 10 of the smart cache DANE—from the requested representations listed in the corresponding request, according to their priority level (an auxiliary relevant representation might be sent to a client terminal CT instead of the main relevant representation, in case the auxiliary relevant representation has a higher priority level than then one of the main relevant representation).

In a variant, the selecting module 17 may also be configured to select, as auxiliary relevant representation, the representation which has the second highest score of relevancy as computed by the scoring module 16. In this case, the communication module 10 may be further configured to request said auxiliary relevant representation from a server SE.

It should be understood that, according to the described embodiment, a score of relevancy is computed for each representation of the requests received by the smart cache DANE during the first period of time, which are not stored yet in the storage module 11 of the smart cache DANE. When at least a first or an alternative representation of the given segment—specified in a request sent by a client terminal CT and received by the smart cache DANE during the first period—is already stored in the latter, the smart cache DANE sends said stored representation to the client terminal. No score of relevancy is preferably computed for any stored representation, but the other representations of the request—if there are others—are used to determine the score of relevancy of the corresponding representation.

In a variant of said embodiment, a score of relevancy may also be computed for the requested representations already stored in the smart cache DANE when the corresponding requests are received by the latter.

In addition, in a further refinement of said embodiment, the communication module 10 may also be configured to request said main relevant representation for the next segment (namely the segment having a temporal relationship with the given segment) from a remote server SE when not stored in the storage module 11 of said smart cache DANE.

This may allow the smart cache DANE to anticipate the needs and to load the next segment with the representation currently selected as relevant before it is even requested by any client terminal CT.

Besides, when the smart cache DANE has reached its maximum storage capacity, it has to manage how to remove content, in order to be able to cache new content. This is performed through an eviction algorithm which removes content that has less chance to be requested again. Known eviction algorithms usually rely on either the date of last cache hit for the content or the frequency of cache hits on the content. In both cases, a content without any request during a defined period of time has a higher probability of being removed from the cache.

According to the present embodiment, two types of cache hit (a cache hit is obtained when a representation stored in said smart cache DANE is sent to a client terminal CT) might be identified:

- a first type of cache hit is reached when a client terminal CT has received, from the smart cache DANE, the first (or preferred) representation specified in its request;
- a second type of cache hit is reached when a client terminal CT has received, from the smart cache DANE, an alternative representation specified in its request.

In particular, the smart cache DANE is further equipped with an eviction module 18 comprising:

- a second counter 18A configured to count the number of times each requested representation already stored in the smart cache DANE is sent to client terminals CT over a second period of time. More particularly, a cache hit of first type is weighted with a first weight, whereas a cache hit of second type is weighted with a second weight. In other words, the second counter 18A makes a distinction between a first type and a second type of cache hit and counts them differently;
- a removal module 18B configured to delete, from the storage module 11, at least the representation with the lowest score of hits.

Thus, the smart cache DANE is configured to count cache hits differently from a more traditional case. For a given segment, cache hits of the first and second types are counted with a weight, which may allow favoring hits for first (or preferred) representation of said segment from hits for alternative representation. The weighting factor can be tuned according to various system needs.

In a further refinement, the eviction module 18 may take into account the temporal variation of the popularity of content towards client terminals CT. Weighted cache hits for each stored representation are computed, by the second counter 18A, over a significant period of time T. The score of hits of each stored representation is kept for a number K of periods T. Each time a new period T is completed, the scores of hits of the stored representations are appended to a list of scores and the oldest scores of hits are removed from said list. This allows to compute the following criterion c for each stored representation with a weighted average of the scores of hits over a sliding window of duration K*T:

$$c = \sum_{p=1}^{p=K} \text{weight}[p] \times \text{score}[p]$$

wherein:
- p denotes the index of the period T in the list (a higher p corresponding to a more recent period T);
- score[p] is the corresponding score of hits for a given stored representation;
- weight[p] is a number which increases with p and allows tuning the relative importance of periods. weight[p] may be simply an affine function (e.g. weight[p]=p) or any other monotonous function (e.g. $p^2$, $\sqrt{p}$, log(p), etc.).

This refinement can provide more importance to recent requests for a representation compared to old requests. For example, during a live event, requests naturally focus on the current content, possibly with some little delay, while older content is no more watched.

Figure 4:
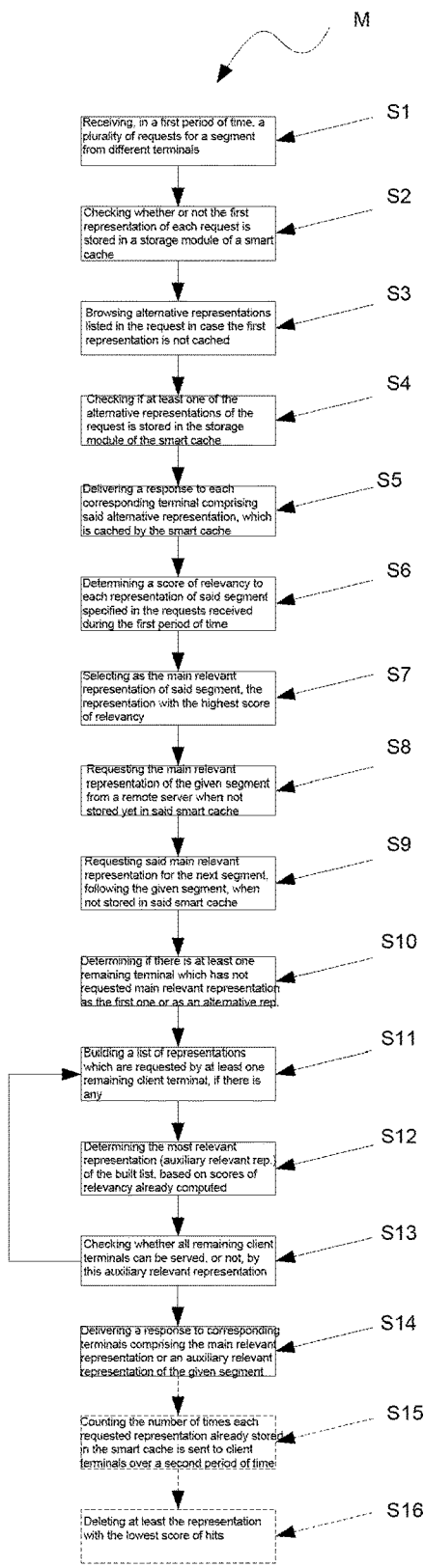
FIG. 4 is a flow chart illustrating the method for operating the smart cache of the FIG. 3, according to the said embodiment.

As illustrated in FIG. 4, according to said particular embodiment, the smart cache DANE is configured to implement the following mechanism M which comprises:
- receiving (step S1), in a first period of time as previously defined, a plurality of HTTP requests for a given segment from different client terminals CT. Each HTTP request specifies one first representation and a list of alternative representations which might be requested in case the first representation is not cached by the smart cache DANE receiving the request. The alternative representations may be listed by priority level or by preference order;
- checking (step S2) whether or not the first representation of each request is stored in the storage module 11 of the smart cache DANE and delivering a response to the corresponding client terminals CT comprising the requested first representation if cached by the smart cache DANE;
- browsing (step S3), by preference order (e.g. from the most desired alternative representation to the less desired) or by priority level if there are any, alternative representations listed in the request in case the first representation is not cached;
- checking (step S4), by preference order (or by priority level), if at least one of the alternative representations of the request is stored in the storage module 9 of the smart cache DANE;
- delivering (step S5) a response to each corresponding client terminal CT comprising said alternative representation of the segment specified in its request, which is cached by the smart cache DANE;
- determining (step S6) a score of relevancy to each representation of said segment specified in the requests received during the first period of time, but not stored yet in the storage module 11 of the smart cache DANE. The score of relevancy associated with a requested representation of said segment corresponds to the number of times said requested representation is specified in the requests received by the smart cache DANE. In a refinement, each representation of a received request having a priority level, the number of times a representation is requested is weighted by a first factor depending on the priority level of said representation;
- selecting (step S7), as the main relevant representation of said segment, the representation with the highest score of relevancy;
- requesting (step S8) the main relevant representation of the given segment from a remote server SE when not stored yet in said smart cache DANE.

In addition, the mechanism M may further comprise the requesting (step S9) of said main relevant representation for the next segment, following the given segment, from a remote server SE, when not stored in said smart cache DANE.

Moreover, the mechanism M may further comprise:
- determining (step S10) if there is at least one remaining client terminal CT which has not requested the main relevant representation as the first one or as an alternative representation;
- building (step S11) a list of representations which are requested by at least one remaining client terminal CT, if there is any;
- determining (step S12) the most relevant representation (hereinafter called auxiliary relevant representation) of the built list, based on scores of relevancy already computed by the scoring module 16. Then, the communication module 10 of the smart cache DANE can request this auxiliary relevant representation;
- checking (step S13) whether all remaining client terminals CT can be served, or not, by this auxiliary relevant representation. If not, the module of relevancy 15 updates the list and determines the new most relevant representation as previously indicated. The process stops when the list is empty (i.e. there is no remaining client terminals CT, all requesting client terminals can be served by the smart cache DANE).

Thus, the smart cache DANE can deliver (step S14) a response to the corresponding client terminals CT comprising the main relevant representation or an auxiliary relevant representation of the given segment according to the priority level of representations listed in each corresponding request sent by the client terminals (an auxiliary relevant representation might be sent to a client terminal CT instead of the main relevant representation, in case the auxiliary relevant representation has a higher priority level than then one of the main relevant representation).

Besides, said mechanism M may also comprise:
- counting (step S15) the number of times each requested representation already stored in the smart cache DANE is sent to client terminals over a second period of time, a requested representation sent to a client terminal CT as a first representation being counted differently than a requested representation sent as an alternative representation;
- deleting (step S16) at least the representation with the lowest score of hits.

The mechanism M may be implemented periodically or upon receipt of a given request for the required segment (e.g. the first request for said segment when none of its representations has been stored in the smart cache DANE yet).

It should be understood that the order of the steps S1 to S16 may be changed, at least partially, without departing from the present invention. For instance, steps S2 to S5 may be performed concurrently with steps S6 to S8.

It should also be noted that the smart cache DANE may be integrated in a proxy, in a gateway or in any other suitable network equipment.

The flowchart and/or block diagrams in the Figures illustrate the configuration, operation and functionality of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination.

As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code, and so forth), or an embodiment combining software and hardware aspects that can all generally be referred to herein as a "circuit," "module", or "system." Furthermore, aspects of the present principles can take the form of a computer readable storage medium. Any combination of one or more computer readable storage medium(s) may be utilized.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a random access memory (RAM); a read-only memory (ROM); an erasable programmable read-only memory (EPROM or Flash memory); a portable compact disc read-only memory (CD-ROM); an optical storage device; a magnetic storage device; or any suitable combination of the foregoing.

The invention claimed is:

1. A method for operating a cache arranged between client terminals and at least one server, said cache being configured to receive requests from client terminals for at least a first representation of a segment of a multimedia content available in a plurality of representations, wherein the method comprises:
receiving, in a first period of time, a plurality of requests for a given segment from client terminals, each request specifying one first representation and at least one alternative representation of said given segment, said given segment being not stored yet in said cache;
determining a score of relevancy for each representation of said given segment specified in the plurality of requests received during the first period of time, the score of relevancy associated with a requested representation of said given segment corresponding to a number of times said requested representation is specified in the plurality of requests received by the cache, wherein, each representation of a received request having a priority level, the number of times a representation is requested is weighted by a first factor depending on the priority level of said representation;
selecting, as a main relevant representation of said given segment, a representation with a highest score of relevancy amongst the determined scores of relevancy, wherein the main relevant representation is the representation with the highest score;
requesting, by said cache, said main relevant representation of the given segment from a remote server.

2. The method according to claim 1, further comprising:
determining if there are one or several remaining client terminals which have not requested the main relevant representation as a first representation or as an alternative representation; building a list of representations which have been requested by said one or several remaining client terminals;
determining the most auxiliary relevant representation of the built list, based on the score of relevancy and requesting said auxiliary relevant representation to a server.

3. The method according to claim 1, further comprising requesting said main relevant representation of a next segment from a remote server, when not stored in said cache.

4. The method according to claim 1, further comprising counting a number of times each requested representation already stored in the cache is sent to client terminals over a second period of time to obtain a score of hits for each requested representation, a requested representation sent to a client terminal as a first representation being counted differently than a requested representation sent as an alternative representation; deleting at least the stored representation with a lowest score of hits.

5. A cache arranged between client terminals and at least one server, said cache being configured to receive, from client terminals, requests for at least a first representation of a segment of a multimedia content available in a plurality of representations,
wherein the cache comprises:
a memory;
a communicator configured to receive, in a first period of time, a plurality of requests for a given segment from client terminals, each request specifying one first representation and at least one alternative representation of said given segment, said given segment being not stored yet in said cache;
a scoring module configured to determine a score of relevancy for each representation of said given segment specified in the plurality of requests received during the first period of time;
a selecting module configured to select, as a main relevant representation of said given segment amongst the representations of the plurality of requests received during the first period of time, a representation with a highest score of relevancy, wherein the main relevant representation is the representation with the highest score; and wherein the communicator is further configured to request said main relevant representation from a remote server and wherein the scoring module comprises at least one first counter configured to determine a number of times each requested representation is specified in the plurality of requests received by the cache, which corresponds to the score of relevancy associated with said requested representation, wherein, each representation of a received request having a priority level, the scoring module is further configured to weight, by a first factor depending on the priority level of said representation, the number of times a representation is requested.

6. The cache according to claim 5, wherein the module of relevancy is further configured:

to determine if there are one or several remaining client terminals which have not requested the main relevant representation as a first representation or as an alternative representation;

to build a list of representations which have been requested by said one or several remaining client terminals;

to determine the most auxiliary relevant representation of the built list, based on the score of relevancy and to request said auxiliary relevant representation to a server.

7. The cache according to claim 5, wherein the communicator is further configured to request said main relevant representation of a next segment from a remote server when not stored in said cache.

8. The cache according to claim 5, further comprising:

a second counter configured to count a number of times each requested representation already stored in the cache is sent to client terminals over a second period of time and obtain a score of hits for each requested representation, a requested representation sent to a client terminal as a first representation being counted differently than a requested representation sent as an alternative representation;

a removal module configured to delete at least the stored representation with a lowest score of hits.

9. The cache according to claim 5, which is a HTTP Adaptive Streaming aware cache.

* * * * *